United States Patent [19]
Corniel

[11] Patent Number: 6,027,607
[45] Date of Patent: Feb. 22, 2000

[54] SALT EXTRACTION PROCESS AND DEVICE

[75] Inventor: Vicente Gracia Corniel, Barcelona, Spain

[73] Assignee: Krebs & Co. AG, Zürich, Switzerland

[21] Appl. No.: 09/051,528

[22] PCT Filed: Oct. 11, 1996

[86] PCT No.: PCT/IB96/01084

§ 371 Date: Jul. 31, 1998

§ 102(e) Date: Jul. 31, 1998

[87] PCT Pub. No.: WO97/13722

PCT Pub. Date: Apr. 17, 1997

[30] Foreign Application Priority Data

Oct. 11, 1995 [ES] Spain ..................................... 9501975

[51] Int. Cl.[7] .............................. B01D 1/00; C01D 3/06; C02F 1/04; C02F 1/16
[52] U.S. Cl. .................................. 159/3; 23/295; 23/303; 159/23; 159/32; 159/44; 159/45; 159/48.1; 159/901; 203/1; 203/10; 203/90; 203/DIG. 8; 203/DIG. 17; 203/48; 239/13; 239/128
[58] Field of Search ............................ 23/295, 298, 303; 73/61.77, 863.12; 159/32, 23, 3, 4.1, 44, 901, 45, 48.1; 203/48, 1, 10, 90, 98, DIG. 8, 2, DIG. 17, DIG. 18; 239/13, 128

[56] References Cited

U.S. PATENT DOCUMENTS 2,555,340  6/1951  Hopper et al. ............................ 23/295
2,660,236 11/1953  Farnsworth ................................ 159/21
3,490,513  1/1970  Villanueva ................................ 203/10
3,601,312  8/1971  Feather ........................................ 239/2
4,704,189 11/1987  Assaf ....................................... 159/48.2
5,366,514 11/1994  Becnel, Jr. et al. ....................... 23/303
5,653,389  8/1997  Henderson et al. ....................... 239/69

FOREIGN PATENT DOCUMENTS 0009506  4/1980  European Pat. Off. .
2447218  8/1980  France .
2450785 10/1980  France .
3612188 10/1987  Germany .

OTHER PUBLICATIONS

R.B. Richards: Grainer Salt, Chapter 12, *Sodium Chloride*, D. Kaufmann (1960).

*Primary Examiner*—Virginia Manoharan
*Attorney, Agent, or Firm*—Pauley Peterson Kinne & Fejer

[57] ABSTRACT

A process for extracting salt from brine contained in at least one open evaporation basin. At least part of the brine is heated in a heating unit located outside the evaporation basis and returned to the evaporation basin. The heating unit is driven by waste heat from a recooling industrial plant. According to this process, climatic values and the degree of recooling are measured and evaluated in a control unit. At least part of the heated brine and some non-heated brine are sprayed by a spraying device of the evaporation basin. The amount of sprayed brine is regulated by the control unit depending on the measured data.

9 Claims, 1 Drawing Sheet

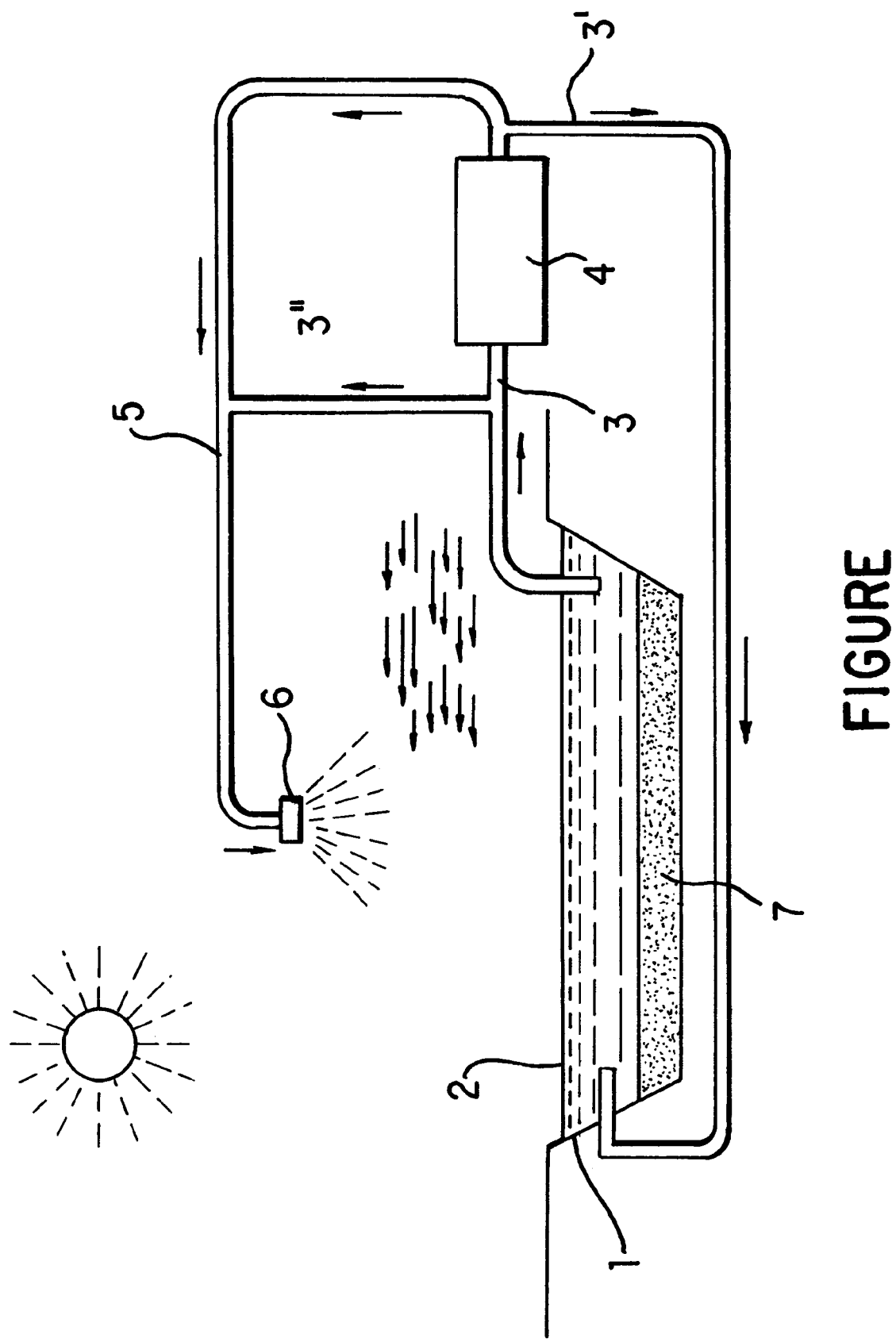
FIGURE

SALT EXTRACTION PROCESS AND DEVICE

BACKGROUND OF THE INVENTION

1. Field of the Invention

This invention relates to a process for salt extraction and a device for executing the process.

2. Description of Prior Art

A process for extracting salt from brine in an open settling or evaporation basin is known from R. B. Richards, Grainer Salt (D. Kaufmann, Sodium Chloride, 1960, Chapter 12). In order to accelerate the evaporation process, the brine is heated to a temperature slightly below the boiling point, typically to 90 to 100° C. In this connection, two different ways of proceeding are known. With the first type, the brine is heated by heating tubes extending inside the basin. With the other type, the brine is continuously moved in a cycle through an external heating unit and returned to the evaporation basin. Such a variant of the Grainer process is described in U.S. Pat. No. 2,660,236.

A further variant of the Grainer process is disclosed in U.S. Pat. No. 2,555,340. Heating is not performed by a heat exchanger, but instead, the brine to be heated is subjected to a direct steam jet.

The Grainer process has several disadvantages. The amount of energy to be supplied is relatively high, in particular since the brine is heated to a temperature slightly below the boiling point. For this reason this process was manly employed in Michigan, where heat in the form of steam was available from sawmills. The effectiveness of the process furthermore strongly depends on the climatic conditions. For economical reasons the process is not used in areas with high temperatures and/or high humidity, since the salt yield does not justify the operating costs. A further disadvantage is that the salt obtained is in the form of platelets and is fine-grained, i.e. with a diameter of less than 2 mm.

A process for extracting salt is furthermore known from French Patent Reference 2,447,218, which permits the formation of larger salt crystals than the known Grainer process, but still provides a higher yield than the salt works operated only by solar radiation. Here, too, an open evaporation basin, which is exposed to solar radiation, is used, but in addition a heated nutrient solution of a preestablished concentration is introduced into a lower layer of the evaporation basin in order to change the solubility in these lower layers.

European Patent Reference 0,009,506 describes a process for salt extraction in a tower of a permeable material, over which seawater is sprayed by means of a sprinkler installation. The evaporated portion is collected, raw salt is added and it is repeatedly sprayed over the tower. This process is expensive and only moderately efficient.

A solar seawater desalination plant is described in German Patent Reference 36 12 188, which constitutes a closed system independent of external environmental influences. Seawater is heated in a heat reservoir and is subsequently sprayed by a spraying device over graduation works. The water evaporates in the graduation works, rises and is cooled again on the walls of the installation and is caught in the form of a salt-free condensate. This installation has the advantage that it only requires sunlight. However, it is not suitable for extracting salt because of the weak salt concentration in the seawater.

SUMMARY OF THE INVENTION

It is therefore one object of this invention to provide a process for salt extraction which achieves high sufficiency by a cost-effective form of energy and compensates for fluctuations in the climatic conditions.

This object is attained by a process wherein climatic values are measured and evaluated in a control unit, and at least a portion of heated brine is sprayed over the at least one evaporation basin, wherein the amount of spray is regulated by the control unit in accordance with the measured climatic data, and by a device having a heating unit connected via a spray line for heated brine with a spraying device arranged over the at least one evaporation basin wherein the climatic values and the degree of recooling of the waste beat are determined and the climatic values and degree of cooling are passed on to a control unit, and having valves and/or pumps for regulating an amount of brine sprayed, which can be regulated by a control unit.

It is a further object of this invention to create a process for salt extraction which not only uses the waste heat from all industrial plant, but also regulates the degree of its recooling.

This object is attained by a process wherein the heating unit is operated by waste heat of an industrial plant for recooling, and a degree of recooling is measured and a value of the measured recooling is taken into account when regulating the amount of spray.

The brine used in the process of this invention, which is sprayed over the evaporation basin, is concentrated, preferably saturated. However, the process can also be performed with unsaturated or pre-evaporated brine. The brine can be previously purified or can be used in an unpurified form. Brine, which has been pretreated with the ASR process for the reduction of dissolved potassium sulfate anhydride ($CaSO_4$) of Applicant, is particularly suitable. The process of this invention can be executed with all types of brine, wherein the examples listed below relate to sodium chloride (NaCl).

Like the Grainer process, the process of this invention is executed in open brine basins, so that the evaporation process is caused by solar radiation and the action of the wind. At least a portion of the brine is heated, wherein the energy required for this stems from the waste heat of any type of industrial plant. A portion is sprayed over the evaporation basin, the remainder is returned directly to the evaporation basin. Preferably the remainder of the brine is also heated in order to accelerate the evaporation process. This heating can take place together with the portion of the brine to be sprayed and in the same heating device, or in a separate device. The separate heating device preferably is either an external heat exchanger or a heat exchanger extending inside the evaporation basin.

It is possible to compensate for the fluctuating environmental effects, such as ambient temperature, humidity and wind speed, by additional spraying of heated brine over the evaporation basin by correspondingly matching the amount of sprayed brine to the measured climatic data. Because of the process of this invention, it is possible to operate open salt extraction installations also in areas which are not climatically optimal for open salt extraction.

The process of this invention permits the construction of deeper evaporation basins than those in connection with conventional, open salt works. Since the evaporation basins have a reduced surface, they are not as much exposed to rain. This, in turn, permits the construction of salt extraction installations in areas of more rain, and allows the use of the evaporation basins for salt storage. The use of the evaporation basin for salt storage is also possible because, in contrast to the Grainer process, continued harvesting of the salt is not compellingly necessary.

In a preferred embodiment of the process of this invention, non-heated brine is sprayed in addition to the heated brine. This is the case in particular, if recooling of the waste heat has already reached the desired value, but the climatic conditions make possible an additional increase of the salt production by spraying brine.

Several evaporation basins are preferably connected in series, wherein one basin overflows into the next basin. It is thus possible to produce salt of different quality in the individual basins. In another embodiment, the evaporation basin is divisible. The heated brine taken from one basin can also be sprayed back into the same basin or into another basin. Furthermore, a continuous overflow or a return to a brine purification installation minimizes the concentration, particularly of water-soluble impurities, in the extracted salt.

Because of the sprayed brine, it is not only possible to affect the salt production, but the waste heat removal or recooling of the industrial plant is controlled, wherein the evaporation basin for salt extraction acts as a spray-cooling basin for recooling.

The amount of brine to be sprayed is calculated from an optimized balance of the following two conditions: on the one hand, it is intended to remove the waste heat from the industrial plant, which in general means that the cooling water heated by the waste heat should be recooled to a defined temperature even under adverse climatic conditions. On the other hand it is intended to optimize the evaporation process for salt extraction in accordance with the climatic conditions.

The process of this invention permits an operation at lower temperatures than with the Grainer process, so that the most varied branches of industry can be considered for providing waste heat. The temperature of the waste heat typically is 40° to 100° C. Therefore the brine is heated to temperatures in the range between 35° and 80° C. Since the brine is clearly heated to a temperature below the boiling point, coarse salt is obtained in the course of evaporation. Typical grain sizes are 2 to 10 mm. The grains of salt generally have a cuboid shape. Therefore the salt obtained by the process of this invention is easier to process further than the fine-grained salt obtained by the Grainer process. The processing method of this invention, known by the trademark SALEX®, is particularly suitable for further processing.

An exemplary embodiment of the process of this invention is a coupling of recooling the waste heat of a power plant operated by methane gas and the extraction of salt from a salt mine. The salt is flushed out of the salt caverns using water and conducted in the form of brine into the evaporation basins, where the water is evaporated by the process of this invention. The now empty salt caverns are used for the storage of methane gas, while the waste heat resulting from the power generation is employed for heating the brine.

BRIEF DESCRIPTION OF THE DRAWING

The FIGURE is a schematic cross-sectional view of the salt extraction installation that operates in accordance with the process of this invention.

DESCRIPTION OF PREFERRED EMBODIMENTS

The salt extraction installation comprises one or a plurality of open evaporation basins 1. The evaporation basins 1 preferably have a considerably greater extension in one direction than in the other direction. The evaporation basins 1 are preferably arranged in such a way that the prevailing wind direction extends transversely to a longitudinal direction of the evaporation basins 1.

At the start of the process, the at least one evaporation basin 1 is filled with brine 2. In this case the brine 2 has a concentration between 3 to 26 percent by weight of sodium chloride (NaCl), preferably almost 26 percent by weight of NaCl. At least a portion of the brine 2 is conducted via lines 3 from the evaporation basin 1 into an external heating unit 4, which is operated by waste beat from an industrial plant.

The brine is heated to 35° to 80° C., depending on the available energy, in this heating unit 4, which preferably is a heat exchanger. In these examples, the heating unit 4 is operated by means of the cooling water of a combined block heat and power plant. The temperature of the cooling water to be cooled typically is approximately 90° C. and can be recooled by means of the process of this invention to 20° to 50° C.

A portion of the heated brine is returned via a return line 3' to the evaporation basin 1. The remaining portion is pumped via controllable valves in a spraying installation 5 to a spraying device 6, where the heated brine is sprayed over the same or an adjacent evaporation basin 1. In addition, depending on the climatic conditions, non-heated brine is sprayed over the evaporation basin 1. To this end, a bypass line 3" is provided from the evaporation basin 1 to the spraying device 6, which bypasses the heating unit 4. The salt 7 crystallizes at the bottom of the evaporation basin 1 and can be removed after the remaining brine 2 is pumped out of the evaporation basin 1. However, the salt 7 can also be left in the basin until the end of the cycle, i.e. until all the water is evaporated. In this way the evaporation basin 1 can be used for salt storage.

The climatic environmental conditions, i.e. the ambient temperature, the humidity and the wind speed, are measured and are evaluated in a control unit for regulation. This control unit regulates the valves and/or the pumps of the spray line in order to adapt the amount of sprayed brine to the measured values and to optimize the evaporation process. By means of regulating the amount of flow the droplet size of the spray is matched to file climatic conditions, in particular the effect of wind. In addition, the droplet size and the distribution of the spray can be chosen by the selective use of differently shaped spray nozzles and the specific activation of individual ones of several spray nozzles distributed over the evaporation basin 1.

However, preferably the amount of sprayed brine is also regulated to correspond to the recooling of the waste heat to be achieved. Thus the degree of recooling, in particular the temperature of the recooled cooling water of the industrial plant, is measured and taken into consideration in the evaluation of the measured climatic values. The actually sprayed amount of brine is mainly dependent on economical calculations. This means that on the one hand the increase in salt extraction by spraying is compared with the energy consumption of the spray installation, in particular the current for the pumps. On the other hand it is necessary to spray at least enough brine so that the proportion of waste heat, which cannot be reduced by way of the evaporation basin 1, is removed via the spray installation.

The at least one evaporation basin 1 preferably has a surface drainage system, for example an overflow dam, for rainwater. Thus, the lighter rainwater can run off without mixing too intensely with the brine 2.

Examples which prove the increased efficiency of the process in accordance with This invention are recited in the following examples.

EXAMPLE 1

An installation in an interior of a country has a surface of approximately 34,000 m$^2$ (3.4 ha) and a depth of approximately 2 m and is divided into three basins of approximately the same size. If this salt extraction installation is only operated by natural evaporation through the effects of the sun and wind, the salt production would be in a vicinity of approximately 15,000 tons per year. If waste heat of 20 MW is used for heating the brine in the evaporation basin, and if the brine is conducted through the heat exchanger with a flow-through amount of approximately 450 m$^3$/h, the salt extraction is increased by 85,000 tons per year. If a portion of the heated brine conducted through the heat exchanger is sprayed over the evaporation basin, while the climatic conditions are taken into consideration, a further increase in production by 55,000 tons per year is achieved.

EXAMPLE 2

An installation is operated under the following climatic conditions:

Temperature: 10° C.;

Relative humidity: 80%; and

Wind speed: 8 km/h.

20 MW waste heat is transferred to the brine, which is sprayed at a flow-through amount of 450 m$^3$/h. The additional amount of water evaporated because of this is approximately 7,500 kg/h, wherein approximately 5 MW additional heat is removed from the system for the evaporation. It becomes clear from this numerical example that it is not only possible to essentially increase the salt extraction, but that in addition the removal of waste heat from the industrial plant takes place efficiently, even with small cooling basins.

EXAMPLE 3

The same installation as the one of Example 2 is subjected to the following climatic conditions:

Temperature: 35° C.;

Relative humidity: 20%; and

Wind speed: 16 km/h.

Under these conditions, the waste heat can also be removed without spraying over the evaporation basin. If in addition 450 m$^3$/h unheated brine are sprayed, the additional amount of evaporated water is approximately 42,000 kg/h. The additionally converted energy is 28 MW. Salt extraction is considerably increased by this.

I claim:

1. In a process for extracting salt from brine (2) in at least one open evaporation basin (1), wherein at least a portion of the brine (2) is heated in a heating unit (4) arranged outside of the evaporation basin (1), and is returned to the evaporation basin (1), the improvement comprising:

measuring and evaluating climatic values in a control unit; and spraying at least a portion of the heated brine over the at least one open evaporation basin (1), wherein an amount of spray is regulated by the control unit as a function of measured climatic data.

2. In the process in accordance with claim 1, wherein the heating unit (4) is operated by waste heat of an industrial plant for recooling, and a degree of recooling is measured and a value of the measured recooling is taken into account when regulating the amount of spray.

3. In the process in accordance with claim 1, wherein the brine (2) has a concentration of 3 to 26 weight percent of sodium chloride (NaCl).

4. In the process in accordance with claim 1, wherein the brine (2) is saturated.

5. In the process in accordance with claim 1, wherein the brine (2) is continuously sprayed at various flow-through amounts.

6. In the process in accordance with claim 1, wherein the brine (2) is heated to a temperature of 35° to 80° C. and then sprayed.

7. In the process in accordance with claim 1, wherein the brine (2) is heated to a temperature of approximately 80° C.

8. In the process in accordance with claim 1, wherein the brine is sprayed over the at least one evaporation basin (1).

9. A device for extracting salt from brine, having at least one evaporation basin (1) connected to a heating unit (4) by a feed line and a return line and operated by waste heat, the improvement comprising: the heating unit (4) connected via a spray line (5) for heated brine with a spraying device (6) arranged over the at least one evaporation basin (1);

means for determining a plurality of climatic values and a degree of recooling of the waste heat and for passing the climatic values and the degree of cooling on to a control unit; and at least one of a plurality of valves and a plurality of pumps regulating an amount of brine sprayed, and a control unit controlling the at least one of the valves and the pumps.

\* \* \* \* \*